(12) United States Patent
Matoba et al.

(10) Patent No.: US 11,294,607 B2
(45) Date of Patent: Apr. 5, 2022

(54) PRINTER, METHOD FOR CONTROLLING PRINTER, AND PRINTING SYSTEM

(71) Applicant: SEIKO EPSON CORPORATION, Tokyo (JP)

(72) Inventors: Yusaku Matoba, Ueda (JP); Toshiaki Koike, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/776,085

(22) Filed: Jan. 29, 2020

(65) Prior Publication Data
US 2020/0249884 A1 Aug. 6, 2020

(30) Foreign Application Priority Data

Jan. 31, 2019 (JP) .............................. JP2019-015672
Jan. 16, 2020 (JP) .............................. JP2020-005246

(51) Int. Cl.
*G06F 3/12* (2006.01)

(52) U.S. Cl.
CPC .......... *G06F 3/1208* (2013.01); *G06F 3/1231* (2013.01); *G06F 3/1255* (2013.01); *G06F 3/12* (2013.01)

(58) Field of Classification Search
CPC .... G06F 3/1208; G06F 3/1255; G06F 3/1231; G06F 3/1203; G06F 3/1232; G06F 3/12
USPC ...................................................... 358/1.15
See application file for complete search history.

(56) References Cited

U.S. PATENT DOCUMENTS

| 2013/0135668 | A1  | 5/2013 | Minagawa |
| 2013/0235422 | A1* | 9/2013 | Nakata .................. G06F 3/1288 358/1.15 |
| 2018/0069981 | A1* | 3/2018 | Pekarske ............ H04N 1/00344 |
| 2018/0183994 | A1* | 6/2018 | Yoshida ................ G06F 3/0484 |

FOREIGN PATENT DOCUMENTS

| JP | H11-065780 | 3/1999 |
| JP | 2006-095805 | 4/2006 |
| JP | 2013-114438 | 6/2013 |
| JP | 2015-185121 | 10/2015 |
| JP | 2017-087690 | 5/2017 |

* cited by examiner

*Primary Examiner* — Marcus T Riley
*Assistant Examiner* — Darryl V Dottin
(74) *Attorney, Agent, or Firm* — Workman Nydegger

(57) ABSTRACT

A printer is configured to communicate with a terminal and includes a printer memory configured to store items corresponding to the printer and item values corresponding to the items and a printer processor. The items include a change-allowed item whose corresponding item value is allowed to be changed and a change-prohibited item whose corresponding item value is prohibited to be changed. When the printer processor receives a transmission request command from the terminal, the printer processor selects the change-allowed item from the items stored in the printer memory, generates transmission information provided with the item value corresponding to the change-allowed item thus selected to transmit the transmission information thus generated to the terminal apparatus.

12 Claims, 3 Drawing Sheets

PRINTER, METHOD FOR CONTROLLING PRINTER, AND PRINTING SYSTEM

The present application is based on, and claims priority from JP Application Serial Numbers 2019-015672, filed Jan. 31, 2019, and 2020-005246, filed Jan. 16, 2020, the disclosures of which are hereby incorporated by reference herein in their entirety.

BACKGROUND

1. Technical Field

The present disclosure relates to a printer, a method for controlling the printer, and a printing system.

2. Related Art

A technique for setting a printer by setting an item value is known. For example, JP A-2013-114438 discloses a technique for registering in advance print items desired to be set and collectively setting set values as item values into detailed items included in the print items registered.

Items relating to a printer such as the print items described in JP A-2013-114438 includes items whose corresponding item values are changeable and items whose corresponding item values are prohibited to be changed, and these items differ for each printer. Thus, in this case, an apparatus configured to perform setting of the printer has to grasp which item is an item changeable for each printer, and thus, the setting of the printer cannot be easily performed.

SUMMARY

According to an aspect of the present disclosure, a printer configured to communicate with an external device (host device, host computer) includes: a memory configured to store items relating to the printer and item values corresponding to the items; and a processor configured to control the memory, wherein the items include a first item whose corresponding item value is allowed to be changed by the external device and a second item whose corresponding item value is prohibited to be changed by the external device, the processor is configured to, when receiving a transmission request command from the external device, select the first item from the items stored in the memory, and generate transmission information provided with the item value corresponding to the first item selected to transmit the transmission information generated to the external device.

In the printer, the processor may be configured to, when receiving a setting command from the external device, store, in the memory, the item value included in the setting command received as the item value corresponding to the first item.

In the printer, the processor may be configured to, when receiving the transmission request command from the external device after storing, in the memory, the item value included in the setting command as the item value corresponding to the first item, select the first item stored from the items in accordance with the setting command, and generate the transmission information to transmit the transmission information to the external device.

In the printer, the transmission information may be information described in JSON format.

Another aspect of the present disclosure is a method for controlling a printer configured to communicate with an external device, the method including: storing items relating to the printer and item values corresponding to the items, the items including a first item whose corresponding item value is allowed to be changed by the external device and a second item whose corresponding item value is prohibited to be changed by the external device; selecting the first item from the items when the printer receives a transmission request command from the external device; and generating transmission information provided with the item value corresponding to the first item selected to transmit the transmission information to the external device.

Still another aspect of the present disclosure is a printing system including: an external device, and a printer configured to communicate with the external device, wherein the printer is configured to store items relating to the printer and item values corresponding to the items, the items include a first item whose corresponding item value is allowed to be changed by the external device and a second item whose corresponding item value is prohibited to be changed by the external device, the external device is configured to transmit a setting command including the item value to the printer, the printer is configured to, when receiving the setting command, store the item value included in the setting command as the item value corresponding to the first item, the external device is configured to transmit a transmission request command to the printer, the printer is configured to, when receiving the transmission request command, generate transmission information including the first item and the item value corresponding to the first item to transmit the transmission information to the external device, and the external device is configured to compare the item value included in the transmission information received with the item value included in the setting command transmitted to determine whether or not setting for the printer is successful.

DESCRIPTION OF EXEMPLARY EMBODIMENTS

Figure 1:
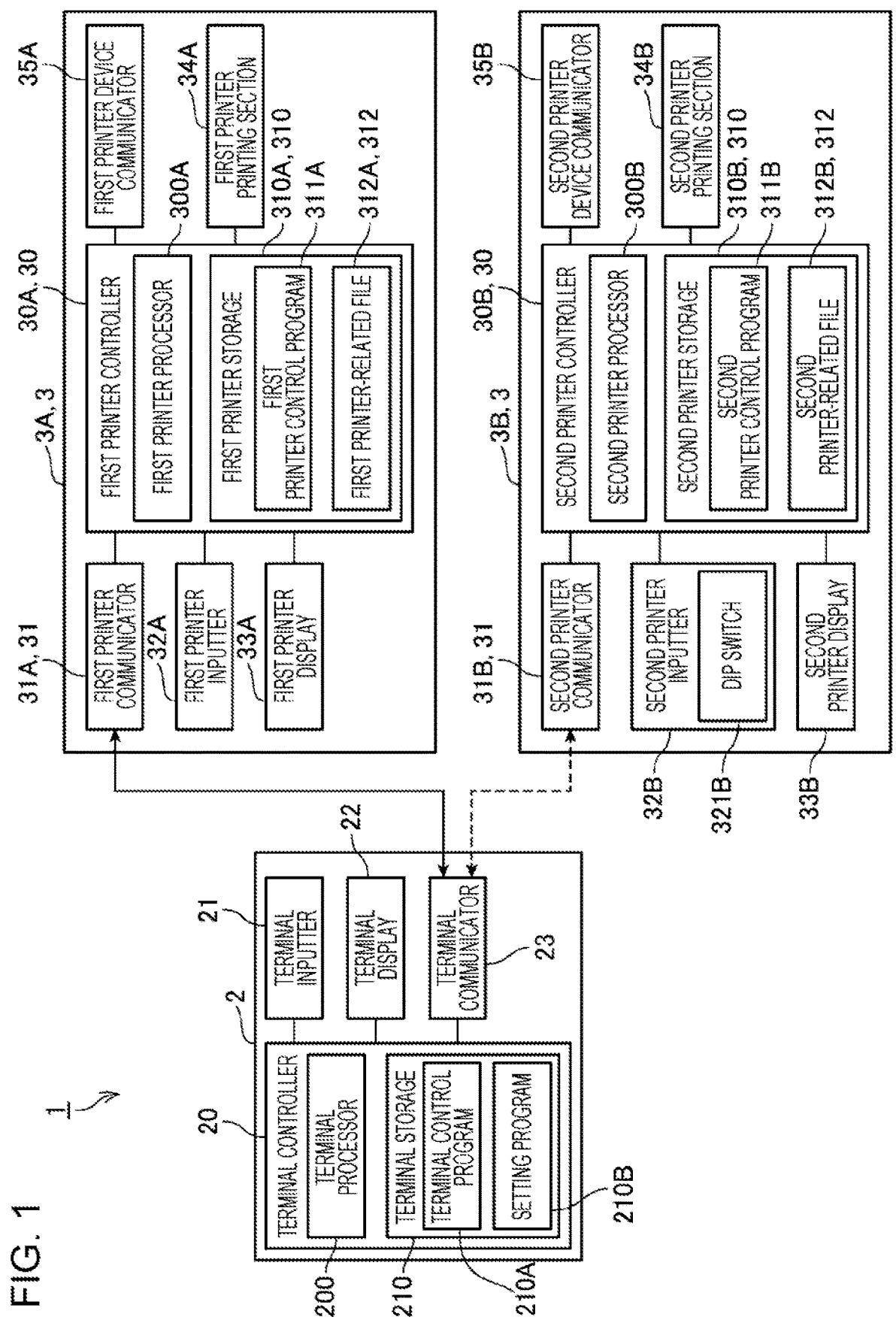
FIG. 1 is a view illustrating a configuration of a printing system.

FIG. 1 is a view illustrating a configuration of a printing system 1. The printing system 1 includes a terminal 2 and a first printer 3A communicatively connected to each other. Alternatively, the printing system 1 includes the terminal 2 and a second printer 3B, in place of the first printer 3A, communicatively connected to each other. In the following description, when the first printer 3A and the second printer 3B are not distinguished from each other, the first printer 3A and the second printer 3B are collectively referred to as "printers 3". Note that the terminal 2 corresponds to an example of an external device (host device, host computer). The first printer 3A and the second printer 3B each correspond to an example of a printer.

The printing system 1 is a system in which the terminal 2 transmits print data to the printers 3, and printing onto roll paper as a print medium is performed based on the print data received by the printers 3. The number of the first printer 3A and the second printer 3B communicatively connectable to the terminal 2 at the same time is not limited, but the present embodiment illustrates a case where one first printer 3A or one second printer 3B is communicatively connected to the terminal 2.

The first printer 3A and the second printer 3B included in the printing system 1 are different models. That is, the second printer 3B is a model including a DIP switch 321B configured to set a baud rate for communication between the terminal 2 and the second printer 3B. On the other hand, the first printer 3A is a model including no DIP switch 321B.

Next, configurations of the terminal 2, the first printer 3A, and the second printer 3B will be described. The terminal 2 is a controller configured to control the printer 3 and is configured to transmit print data to the printer 3, which is, for example, communicatively connected to the terminal 2, to cause the printer 3 to perform printing. The terminal 2 may be a tablet type or a desktop type.

The terminal 2 includes a terminal controller (terminal control circuit) 20, a terminal inputter (terminal input device) 21, a terminal display (terminal display device) 22, and a terminal communicator 23.

The terminal controller 20 is a circuit which includes a terminal processor 200 and a terminal storage 210 and which controls components in the terminal 2. The terminal processor 200 is a processor, such as a CPU or an MPU, configured to execute a program. In the terminal controller 20, hardware and software cooperate to execute various processes such that the terminal processor 200 reads a terminal control program 210A stored in the terminal storage 210 so as to execute a process.

The terminal storage (terminal memory) 210 includes a storage area configured to store programs to be executed by the terminal processor 200 and data to be processed by the terminal processor 200. The terminal storage 210 stores the terminal control program 210A serving as a control program to be executed by the terminal processor 200 and various other types of data. The terminal storage 210 further stores a setting program 210B for setting the printer 3. The terminal storage 210 includes a nonvolatile storage area which non-volatilely stores programs and data. Alternatively, the terminal storage 210 may include a volatile storage area to configure a work area for transitory storage of programs to be executed by the terminal processor 200 and data as a process target.

The terminal inputter 21 includes an operation switch provided to the terminal 2 and an input means such as a keyboard or touch panel coupled to the terminal 2, detects an operation given to the input means by a user who operates the terminal 2, and outputs the operation to the terminal controller 20. The terminal controller 20 executes, based on the input from the terminal inputter 21, a process corresponding to the operation given to the input means.

The terminal display 22 includes a display panel such as a liquid crystal display panel and displays various types of information in accordance with control by the terminal controller 20.

The terminal communicator 23 includes communication hardware according to a prescribed communication standard and is controlled by the terminal controller 20 so as to communicate with the first printer 3A or the second printer 3B. Examples of the communication hardware include hardware such as a communication circuit, a communication port, a communication substrate, and a communication connector. The communication standard used between the terminal communicator 23 and the printer 3 may be a standard according to wired communication or may be a standard according to wireless communication. Examples of the standard according to the wired communication include serial communication standards such as USB and RC232C, a parallel communication standard such as IEEE1284, and Ethernet. Ethernet is a registered trademark. Examples of the standard according to the wireless communication include a communication standard according to wireless LAN such as Wi-Fi and a communication standard according to near field communication such as Bluetooth. Wi-Fi is a registered trademark. Bluetooth is a registered trademark.

The printer 3 is a thermal printer which accommodates roll paper and which forms dots with a line-type print head to print, for example, characters and/or images onto the roll paper accommodated. The print system of the printer 3 according to the present embodiment is a thermal system. However, the print system of the printer 3 is not limited to the thermal system but may be another print system such as an ink jet system. The print head of the printer 3 is not limited to the line type but may be a serial type.

First, a configuration of the first printer 3A will be described. The first printer 3A includes a first printer controller (first printer control circuit) 30A, a first printer communicator 31A, a first printer inputter (first printer input apparatus) 32A, a first printer display (first printer display device) 33A, a first printer printing section (first printer printing mechanism) 34A, and a first printer device communicator 35A. The first printer controller 30A corresponds to an example of a controller. The first printer communicator 31A corresponds to an example of a communicator.

The first printer controller 30A is a circuit which includes a first printer processor 300A and a first printer storage 310A and which controls components in the first printer 3A. The first printer processor 300A is a processor, such as a CPU or an MPU, configured to execute a program. The first printer storage 310A corresponds to an example of storage. In the first printer controller 30A, hardware and software cooperate to execute various processes such that the first printer processor 300A reads a first printer control program 311A stored in the first printer storage 310A to execute a process.

The first printer storage (first printer memory) 310A includes a storage area configured to store programs to be executed by the first printer processor 300A and data to be processed by the first printer processor 300A. The first printer storage 310A stores the first printer control program 311A serving as a control program to be executed by the first printer processor 300A and various other types of data. The first printer storage 310A also stores a first printer-related file 312A. Details of the first printer-related file 312A will be described later. The first printer storage 310A includes a nonvolatile storage area which non-volatilely stores programs and data.

Alternatively, the first printer storage 310A may include a volatile storage area to configure a work area for transitory storage of programs to be executed by the first printer processor 300A and data as a process target.

The first printer communicator 31A includes communication hardware according to a prescribed communication standard and is controlled by the first printer controller 30A to communicate with the terminal 2. Examples of the communication hardware include hardware such as a communication circuit, a communication port, a communication substrate, and a communication connector.

The first printer inputter 32A includes an input means such as an operation switch or a touch panel provided to the first printer 3A, detects an operation given to the input means by a user, and outputs the operation to the first printer controller 30A. The first printer controller 30A executes, based on the input from the first printer inputter 32A, a process corresponding to the operation given to the input means.

The first printer display 33A includes a plurality of LEDs, a display panel, and the like, and is controlled by the first printer controller 30A to execute turning on/off of the LEDs in a prescribed pattern, displaying of information on the display panel, and the like.

The first printer printing section 34A includes various types of mechanisms, such as a transport mechanism configured to transport roll paper accommodated in a housing of the first printer 3A, a printing mechanism configured to form dots onto the roll paper with the print head so as to print an image, and a cutting mechanism configured to cut the roll paper at a prescribed location, relating to printing onto the roll paper. The first printer printing section 34A is controlled by the first printer controller 30A to transport the roll paper by using the transport mechanism, prints an image relating to a print material to be issued onto the roll paper by using the printing mechanism, and cuts the roll paper at the prescribed location by using the cutting mechanism, thereby issuing the print material such as a receipt.

The first printer device communicator 35A includes an interface board including a port according to a USB standard, a port according to a serial communication standard other than the USB standard, a port according to a parallel communication standard, a port according to a communication standard according to a wired LAN, and other ports. It is possible to couple a device to each port. The first printer device communicator 35A is controlled by the first printer controller 30A to communicate with a device connected via a port to the first printer 3A. The first printer device communicator 35A may have a wireless communication function to perform wireless communication with a device. Examples of the device to be connected to the first printer 3A include POS external device devices such as a bar code reader, a customer display, and automatic change machine.

Next, a configuration of the second printer 3B will be described. The second printer 3B includes a second printer controller (second printer control circuit) 30B, a second printer communicator 31B, a second printer inputter (second printer input apparatus) 32B, a second printer display (second printer display device) 33B, a second printer printing section (second printer printing mechanism) 34B, and a second printer device communicator 35B. The second printer controller 30B corresponds to an example of a controller. The second printer communicator 31B corresponds to an example of a communicator.

In the following description, when the first printer controller 30A and the second printer controller 30B are not distinguished from each other, the first printer controller 30A and the second printer controller 30B are collectively referred to as "printer controllers" and are denoted by reference number "30". Moreover, when the first printer communicator 31A and the second printer communicator 31B are not distinguished from each other, the first printer communicator 31A and the second printer communicator 31B are collectively referred to as "printer communicators" and are denoted by reference number "31".

The second printer controller 30B is a circuit which includes a second printer processor 300B and a second printer storage 310B and which controls components in the second printer 3B. The second printer processor 300B is a processor, such as a CPU or an MPU, configured to execute a program. The second printer storage 310B corresponds to an example of storage. In the second printer controller 30B, hardware and software cooperate to execute various processes such that the second printer processor 300B reads a second printer control program 311B stored in the second printer storage 310B to execute a process.

The second printer storage (second printer memory) 310B includes a storage area configured to store programs to be executed by the second printer processor 300B and data to be processed by the second printer processor 300B. The second printer storage 310B stores the second printer control program 311B serving as a control program to be executed by the second printer processor 300B and various other types of data. The second printer storage 310B also stores a second printer-related file 312B. Details of the second printer-related file 312B will be described later. The second printer storage 310B includes a nonvolatile storage area which non-volatilely stores programs and data. Alternatively, the second printer storage 310B may include a volatile storage area to configure a work area for transitory storage of programs to be executed by the second printer processor 300B and data as a process target.

In the following description, when the first printer storage 310A and the second printer storage 310B are not distinguished from each other, the first printer storage 310A and the second printer storage 310B are collectively referred to as "printer storage (printer memory)" and are denoted by reference number "310". Moreover, when the first printer-related file 312A and the second printer-related file 312B are not distinguished from each other, the first printer-related file 312A and the second printer-related file 312B are collectively referred to as "printer-related files" and are denoted by reference number "312".

The second printer communicator 31B includes communication hardware according to a prescribed communication standard and is controlled by the second printer controller 30B to communicate with the terminal 2. Examples of the communication hardware include hardware such as a communication circuit, a communication port, a communication substrate, and a communication connector.

The second printer inputter 32B includes an input means such as an operation switch or a touch panel provided to the second printer 3B, detects an operation given to the input means by a user, and outputs the operation to the second printer controller 30B. The second printer controller 30B executes, based on the input from the second printer inputter 32B, a process corresponding to the operation given to the input means. Unlike the first printer inputter 32A, the second printer inputter 32B includes a DIP switch 321B. The DIP switch 321B of the present embodiment is a mechanical switch for setting a baud rate for communication with the terminal 2. The DIP switch 321B is provided at a prescribed location of the second printer 3B.

The second printer display 33B has a similar configuration to the first printer display 33A and is controlled by the second printer controller 30B to execute turning on/off of the LEDs in a prescribed pattern, displaying of information on the display panel, and the like.

The second printer printing section 34B has a similar configuration to the first printer printing section 34A and is controlled by the second printer controller 30B to transport the roll paper by using the transport mechanism, prints an image relating to a print material to be issued onto the roll paper by using the printing mechanism, and cuts the roll paper at the prescribed location by using the cutting mechanism, thereby issuing the print material such as a receipt.

The second printer device communicator 35B has a similar configuration to the first printer device communicator 35A and is controlled by the second printer controller 30B to communicate with a device coupled via a port to the second printer 3B. The second printer device communicator 35B may have a wireless communication function to perform wireless communication with a device. Examples of the device to be connected to the second printer 3B include a device similar to the device to be connected to the first printer 3A.

Figure 2:
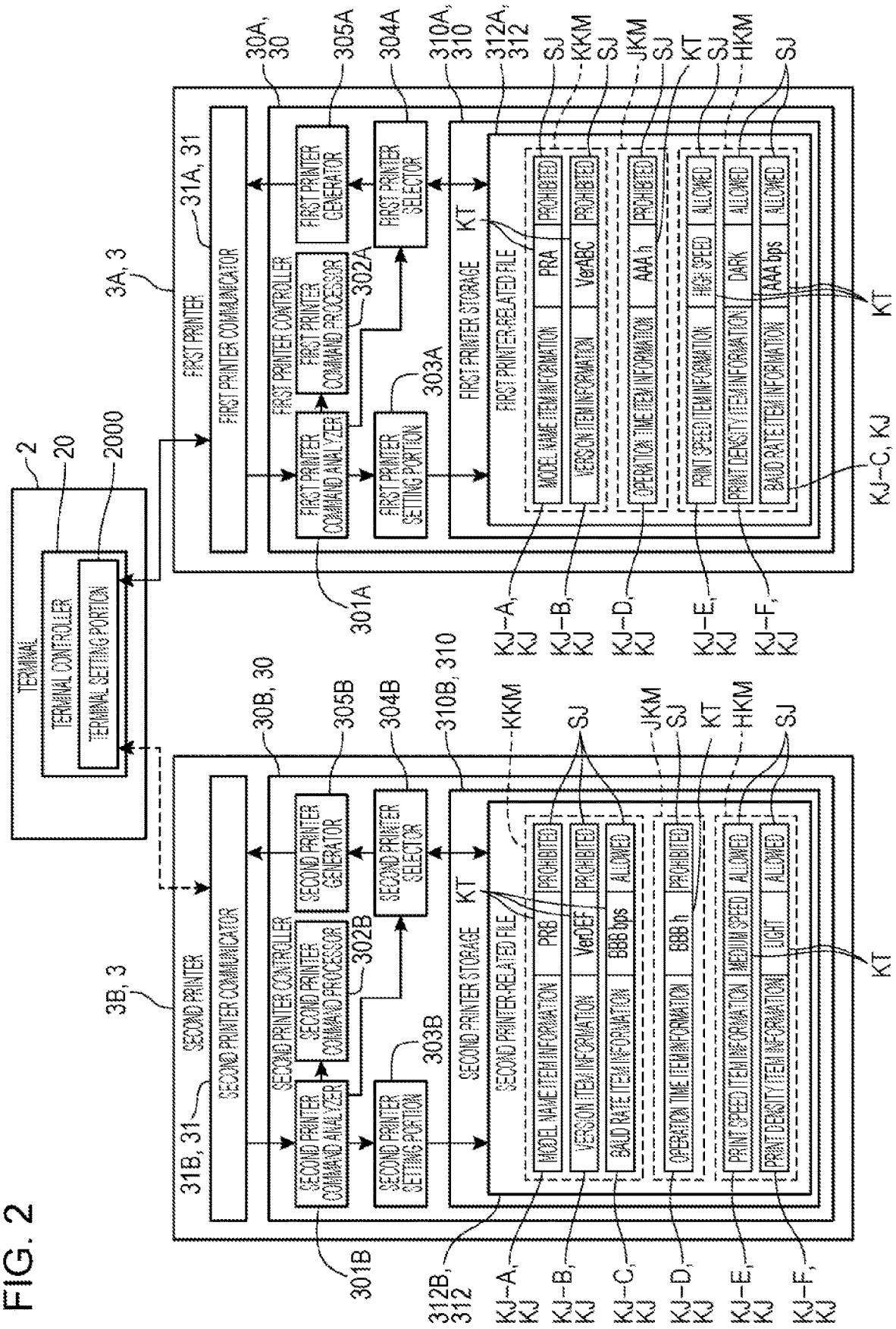
FIG. 2 is a view illustrating functional blocks of a terminal and a printer.

Next, functional blocks corresponding to the terminal controller 20, the first printer controller 30A, and the second printer controller 30B will be described. FIG. 2 is a view illustrating the functional blocks corresponding to the terminal controller 20, the first printer controller 30A, and the second printer controller 30B. In FIG. 2, for the sake of description, the first printer communicator 31A, the second printer communicator 31B, the first printer-related file 312A, and the second printer-related file 312B are shown.

First, the functional block corresponding to the terminal controller 20 will be described. The terminal controller 20 includes a terminal setting portion 2000. The terminal setting portion 2000 is a functional member realized by reading and executing the setting program 210B by the terminal processor 200.

The terminal setting portion 2000 executes setting of the printer 3. In the present embodiment, the setting of the printer 3 refers to setting item values KT into change-allowed items HKM of items which relate to the printer 3 and which are included in the printer-related file 312. The change-allowed item HKM corresponds to an example of a first item.

Here, the printer-related file 312 will be described. The printer-related file 312 is a file in which combinations of pieces of item information KJ and respective item values KT are described. The pieces of item information KJ show the items relating to the printer 3. The item values KT are item values set in the items relating to the printer 3.

In the present embodiment, the items relating to the printer 3 include change-prohibited items, KKM automatic change items JKM, and change-allowed items HKM. The item values KT corresponding to the change-prohibited items KKM are prohibited to be changed. The item values KT corresponding to the automatic change items JKM are automatically changed by the printer 3. The item values KT corresponding to the change-allowed items HKM are allowed to be changed by the terminal 2. The change-prohibited item KKM corresponds to an example of a second item.

In the present embodiment, the printer-related file 312 includes a model name item and a version item as the change-prohibited items KKM. The model name item is an item relating to the model name of the printer 3. The item value KT set in the model name item is a value showing the model name of the printer 3. In the first printer-related file 312A shown in FIG. 2, the item value KT showing model name "PRA" is described in association with model name item information KJ-A which is item information KJ showing the model name item. This shows that in the first printer-related file 312A, the item value KT showing the model name "PRA" is set in the model name item. In the second printer-related file 312B shown in FIG. 2, the item value KT showing model name "PRB" is described in association with model name item information KJ-A.

The version item is an item relating to the version of firmware which is installed (stored) in the printer 3 and which is not shown in the figure. The item value KT set in the version item is a value showing the version of the firmware installed in the printer 3. In the first printer-related file 312A shown in FIG. 2, the item value KT showing version "VerABC" is described in association with version item information KJ-B which is item information KJ showing the version item. In the second printer-related file 312B shown in FIG. 2, the item value KT showing the version "VerDEF" is described in association with the version item information KJ-B.

The second printer-related file 312B includes a baud rate item as the change-prohibited item KKM. In contrast, the first printer-related file 312A includes no baud rate item as the change-prohibited item KKM.

The baud rate item is an item relating to the baud rate for communication with the terminal 2. The item value KT set in the baud rate item is a value showing a baud rate (communication speed of serial communication). In the second printer-related file 312B shown in FIG. 2, the item value KT showing baud rate "BBB bit per second (bps)" is described in association with the item information KJ showing the baud rate item. The item value KT set in the baud rate item of the second printer-related file 312B is a value corresponding to a baud rate which the DIP switch 321B sets.

Note that as described above, the second printer-related file 312B includes the baud rate item as the change-prohibited item KKM because of the following reason. It is assumed that the baud rate item is present as the change-allowed item HKM in the second printer-related file 312B. In this case, the item value KT corresponding to the baud rate item is allowed the be changed by the terminal 2, and therefore, a difference may occur between the baud rate set by the DIP switch 321B and the baud rate shown by the item value KT set in the baud rate item, which may influence communication between the terminal 2 and the second printer 3B. Thus, in order not to cause the difference between the baud rates, the baud rate item is present as the change-prohibited item KKM in the second printer-related file 312B.

In the present embodiment, as the automatic change item JKM of the printer-related file 312, an operation time item is present. The operation time item is an item relating to the operation time of the printer 3. The item value KT set in the operation time item is a value showing the operation time of the printer 3. The printer controller 30 cumulatively counts the operation time of the printer 3 and sets the item value KT showing the operation time counted at a prescribed timing as the operation time item. In the first printer-related file 312A shown in FIG. 2, the item value KT showing operation time "AAA hour (h)" is described in association with operation time item information KJ-D which is item information KJ showing the operation time item. In the second printer-related file 312B shown in FIG. 2, the item value KT showing operation time "BBB h" is described in association with model name item information KJ-D.

In the present embodiment, as the change-allowed items HKM of the printer-related file 312, a print speed item and a print density item are present. The print speed item is an item relating to the print speed of the printer 3. The item value KT set in the print speed item is a value showing a print speed. In the present embodiment, the print speed of the printer 3 includes three speeds, namely, "high speed", "medium speed", and "low speed". In the first printer-related file 312A shown in FIG. 2, the item value KT showing the print speed "high speed" is described in association with print speed item information KJ-E which is item information KJ showing the print speed item. In the second printer-related file 312B shown in FIG. 2, the item value KT showing the print speed "medium speed" is described in association with the print speed item information KJ-E.

The print density item is an item relating to a print density showing the density of characters and/or images to be printed onto the roll paper. The item value KT set in the print density item is a value showing a print density. In the present embodiment, the print density includes three densities, namely, "dark", "normal", and "light". In the first printer-related file 312A shown in FIG. 2, the item value KT showing the print density "dark" is described in association with print density item information KJ-F which is item information KJ showing the print density item. In the second printer-related file 312B shown in FIG. 2, the item value KT showing the print density "light" is described in association with print density item information KJ-F.

In the first printer-related file 312A, a baud rate item is present as the change-prohibited item HKM. In contrast, in the second printer-related files 312B, no baud rate item is present as the change-allowed item HKM.

In the first printer-related file 312A shown in FIG. 2, the item value KT showing baud rate "AAA bps" is described in association with item information KJ-C.

Returning to the description of the terminal setting portion 2000, the terminal setting portion 2000 generates a transmission request command and a setting command during setting of the printer 3 and transmits the commands to the printer 3. Detailed operation of the terminal setting portion 2000 during the setting of the printer 3 will be described later with reference to FIG. 3. The transmission request command is a command which requests, for all the change-allowed items HKM included in the printer-related file 312, transmission of combinations of the item information KJ and the item value KT set in the printer-related file 312. The setting command is a command instructing setting of the item value KT and includes, for each change-allowed item HKM included in transmission information described later, a combination of the item information KJ and the item value KT to be set. Specific examples of the setting command will be described later.

Next, the functional block corresponding to the first printer controller 30A will be described. The first printer controller 30A includes a first printer command analyzer 301A, a first printer command processor 302A, a first printer setting portion 303A, a first printer selector 304A, and a first printer generator 305A. These components are functional members realized by executing the first printer control program 311A by the first processor 300A.

The first printer command analyzer 301A is a functional member configured to analyze a command received by the first printer communicator 31A. The first printer command analyzer 301A determines whether the command received is the transmission request command, the setting command, or the other command. The determination of the commands is performed based on, for example, an instruction code (ESC, GS).

If the command received by the first printer communicator 31A is the transmission request command, the first printer command analyzer 301A outputs the transmission request command to the first printer selector 304A. Alternatively, if the command received by the first printer communicator 31A is the setting command, the first printer command analyzer 301A outputs the setting command to the first printer setting portion 303A. Alternatively, if the command received by the first printer communicator 31A is a command other than the transmission request command and the setting command, the first printer command analyzer 301A outputs the command to the first printer command processor 302A. Examples of the command other than the transmission request command and the setting command include a print command instructing execution of printing.

The first printer command processor 302A executes a process based on a command input from the first printer command analyzer 301A. If the command input from the first printer command analyzer 301A is the print command, the first printer command processor 302A controls the first printer printing section 34A with reference to the first printer-related file 312A to perform printing onto roll paper. In the case of the first printer-related file 312A shown in FIG. 2, the first printer command processor 302A controls the first printer printing section 34A such that printing is performed at a print speed corresponding to the print speed "high speed" and at a print density corresponding to the print density "dark", thereby performing printing onto roll paper.

Based on the setting command input from the first printer command analyzer 301A, the first printer setting portion 303A sets, in the first printer-related file 312A, the item value KT included in the setting command. Saying that the item value KT is set in the printer-related file 312 corresponds to an example of storing the item value KT in the printer storage 310. To set an item value KT included in the setting command, the first printer setting portion 303A sets an item value KT into the same item as an item which is indicated by the item information KJ to be combined with an item value KT and which is included in items in the first printer-related file 312A. Saying that an item value KT is set into an item corresponds to that an item value KT is described in association with an item information KJ in the printer-related file 312. For example, it is assumed that the setting command output from the first printer command analyzer 301A includes a combination of the print speed item information KJ-F and the item value KT representing the print speed "medium speed". In this case, the first printer setting portion 303A sets, for the print speed item of the first printer-related file 312A, an item value KT representing the print speed "medium speed" included in the setting command.

Based on the transmission request input from the first printer command analyzer 301A, the first printer selector 304A selects the change-allowed item HKM from the plurality of items included in the first printer-related file 312A. In each item in the first printer-related file 312A, selection information SJ indicating whether a change of the item value KT is allowed or prohibited is described in correspondence with the combination of the item information KJ and the item value KT. The first printer selector 304A selects, as the change-allowed item HKM, an item indicated by the item information KJ to which the selection information SJ corresponds, the selection information SJ indicating that the item value KT is allowed to be changed.

For example, in the first printer-related file 312A shown in FIG. 2, the selection information SJ indicating that the item value KT is allowed to be changed corresponds to each of the print speed item, the print density item, and the baud rate item. Thus, the first printer selector 304A selects, as the change-allowed item HKM, each of the print speed item, the print density item, and the baud rate item from the items in the first printer-related file 312A shown in FIG. 2.

For all the change-allowed items HKM thus selected, the first printer selector 304A reads combinations of the item information KJ and the item value KT from the first printer-related file 312A. Then, the first printer selector 304A outputs the combinations thus read to the first printer generator 305A.

The first printer generator 305A generates transmission information including all the combinations output from the first printer selector 304A and transmits the transmission information generated to the terminal 2 via the first printer communicator 31A. The transmission information is information including a combination of the item information KJ and the item value KT and is thus information including the corresponding item value KT added to the change-allowed item HKM selected by the first printer selector 304A.

Next, the functional block corresponding to the second printer 3B will be described. The second printer 3B includes a second printer command analyzer 301B, a second printer command processor 302B, a second printer setting portion 303B, a second printer selector 304B, and a second printer generator 305B. These components are functional members realized by executing the second printer control program 311B by the second processor 300B.

The second printer command analyzer 301B executes a process similar to that executed by the first printer command analyzer 301A. That is, the second printer command analyzer 301B determines whether the command received is the transmission request command, the setting command, or the other command, and the second printer command analyzer 301B outputs the command to a transmission destination depending on the determination.

The second printer command processor 302B executes a process in the same manner as the first printer command analyzer 302A. That is, the second printer command processor 302B executes a process based on the transmission request command and a command other than the setting command.

Based on the setting command input from the second printer command analyzer 301B, the second printer setting portion 303B sets, in the second printer-related file 312B, the item value KT included in the setting command in a manner similar to the first printer setting portion 303A.

Based on the transmission request, the second printer selector 304B selects the change-allowed item HKM from the plurality of items included in the second printer-related file 312B in a manner similar to the first printer selector 304A.

For example, in the second printer-related file 312B shown in FIG. 2, the selection information SJ indicating that the item value KT is allowed to be changed corresponds to each of the print speed item and the print density item. Thus, the second printer selector 304B selects, as the change-allowed item HKM, each of the print speed item and the print density item from the items in the second printer-related file 312B shown in FIG. 2. For all the change-allowed items HKM thus selected, the second printer selector 304B reads combinations of the item information KJ and the item value KT from the second printer-related file 312B. Then, the second printer selector 304B outputs the combinations thus read to the second printer generator 305B.

The second printer generator 305B generates transmission information including all the combinations output from the second printer selector 304B and transmits the transmission information generated to the terminal 2 via the second printer communicator 31B. The transmission information is information including a combination of the item information KJ and the item value KT and is thus information including the corresponding item value KT added to the change-allowed item HKM selected by the second printer selector 304B.

The transmission information generated by the first printer generator 305A and the transmission information generated by the second printer generator 305B are pieces of information described in JSON (JavaScript Object Notation) format which is a structured language. Note that JavaScript is a registered trademark. Thus, the first printer generator 305A and the second printer generator 305B enable an increase in data size of the transmission information to be suppressed even in the case of a large number of combinations of the item information KJ and the item value KT included in the transmission information.

Figure 3:
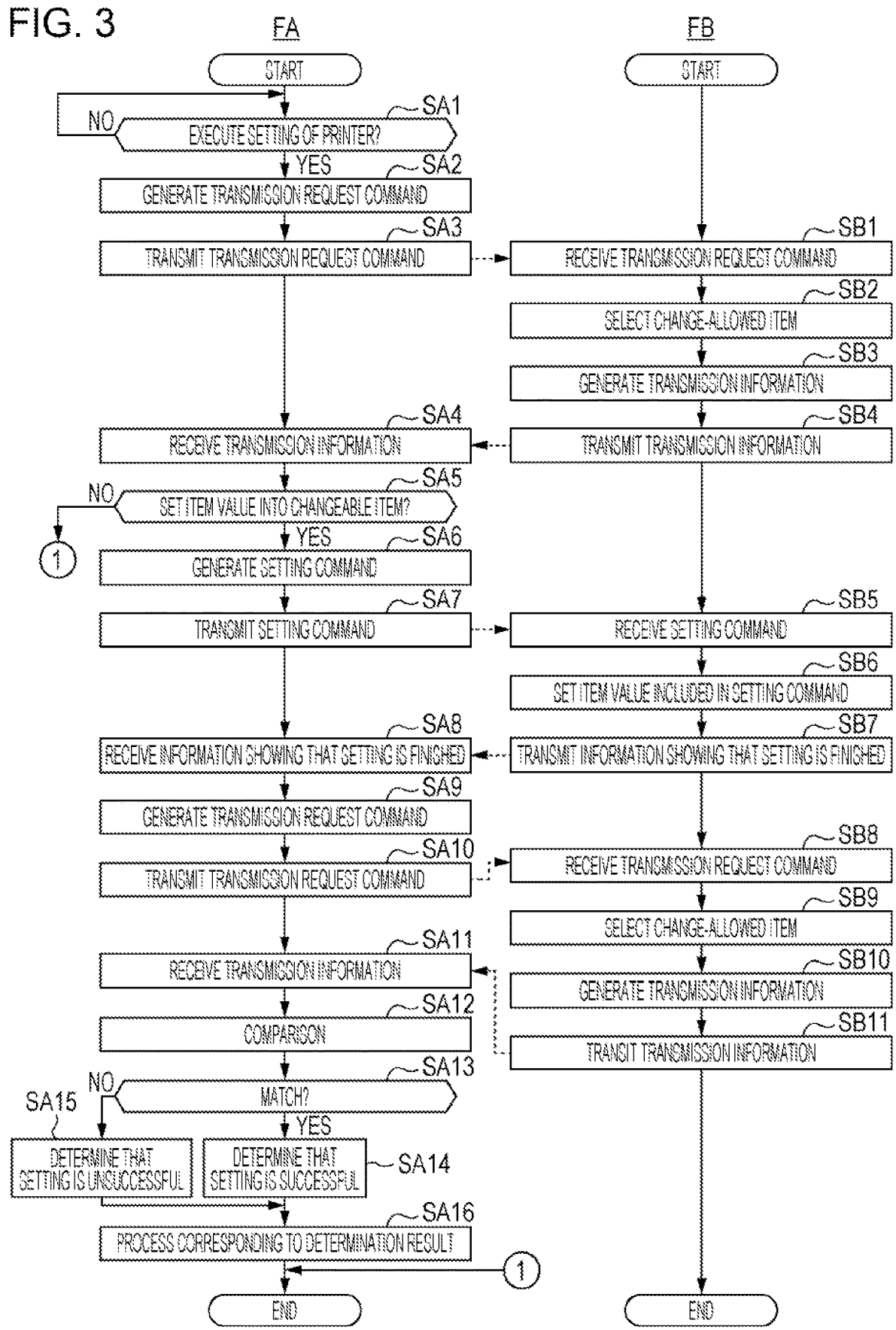
FIG. 3 is a flowchart illustrating operation of the terminal and the printer.

Next, operation of the terminal 2 and operation of the printer 3 during the setting of the printer 3 will be described. FIG. 3 is a flowchart illustrating the operation of the terminal 2 and the printer 3. In FIG. 3, the flowchart FA shows the operation of the terminal 2, and the flowchart FB shows the operation of the printer 3.

The description with reference to FIG. 3 illustrates the operation of the first printer 3A as the printer 3. That is, the description with reference to FIG. 3 illustrates operation in the case where the terminal 2 and the first printer 3A are communicatively connected to each other, and the terminal 2 performs the setting of the first printer 3A. Note that when the terminal 2 is communicatively connected to the second printer 3B, and the terminal 2 performs the setting of the second printer 3B, the second printer 3B performs operation similar to the operation of the first printer 3A described below.

As shown in the flowchart FA, the terminal setting portion 2000 of the terminal controller 20 of the terminal 2 determines whether or not the setting of the printer 3 is executed (step SA1). For example, when the terminal display 22 displays a user interface according to the setting of the printer 3 based on the function of the setting program 210B and execution of the setting of the printer 3 is instructed via the user interface, the terminal setting portion 2000 performs affirmative determination in step SA1. Note that a trigger for the affirmative determination in step SA1 is not limited to a case where the execution of the setting of the printer 3 is instructed via the user interface.

When the terminal setting portion 2000 determines execution of the setting of the printer 3 (step SA1: YES), the terminal setting portion 2000 generates a transmission request command (step SA2), and the terminal communicator 23 transmits the transmission request command thus generated to the first printer 3A (step SA3).

Referring to the flowchart FB, the printer controller 30A of the first printer 3A receives the transmission request command via the first printer communicator 31A (step SB1). The transmission request command thus received is output to the first printer selector 304A via the first printer command analyzer 301A.

Next, based on the transmission request command, the first printer selector 304A of the first printer controller 30A selects the change-allowed items HKM from the plurality of items included in the first printer-related file 312A (step SB2).

In the case of the first printer-related file 312A shown in FIG. 2, the first printer selector 304A selects the print speed item, the print density item, and the baud rate item as the change-allowed items HKM from the plurality of items in the first printer-related file 312A. Note that in the case of operation of the terminal 2 and the second printer 3B, the second printer selector 304B of the second printer 3B selects the print speed item and the print density item as the change-allowed items HKM from the plurality of items included in the second printer-related file 312B.

Then, the first printer generator 305A of the first printer controller 30A generates, for all the change-allowed items HKM selected by the first printer selector 304A, transmission information including combinations of the item information KJ and the item value KT (step SB3).

In the case of the first printer-related file 312A shown in FIG. 2, the first printer generator 305A generates, for the print speed item, the print density item, and the baud rate item, transmission information including combinations of the item information KJ and the item value KT set in the first printer-related file 312A. In more detail, the first printer generator 305A generates transmission information including a combination of the print speed item information KJ-E and the item value KT representing the print speed "high speed", a combination of the print density item information KJ-F and the item value KT representing the print density "dark", and a combination of the baud rate item information KJ-C and the item value KT representing the baud rate "AAA bps". Note that in the case of operation of the terminal 2 and the second printer 3B, the second printer generator 305B generates, for the print speed item and the print density item, transmission information including a combination of the item information KJ and the item value KT set in the second printer-related file 312B.

Next, the first printer generator 305A transmits the transmission information thus generated to the terminal 2 via the first printer communicator 31A (step SB4).

Thus, when the first printer controller 30A receives the transmission request command from the terminal 2, the first printer controller 30A selects the change-allowed items HKM from the plurality of items included in the first printer-related file 312A. Then, the first printer controller 30A generates the transmission information provided with the item values KT corresponding to the change-allowed items HKM thus selected and transmits the transmission information to the terminal 2. This enables the terminal 2 to determine, without grasping which item of the items related to the first printer 3A is the change-allowed item HKM, which item of the items related to the first printer 3A is the change-allowed item HKM based on the transmission information transmitted from the first printer 3A. Thus, also in the case of the first printer 3A and the second printer 3B which are different from each other in terms of the change-allowed items HKM and the change-prohibited items KKM, the terminal 2 is configured to determine, without grasping which item is the change-allowed item HKM for each printer 3, which item is the change-allowed item HKM for each printer 3. Therefore, the terminal 2 is configured to easily set the printers 3 also when the change-allowed item HKM and the change-prohibited item KKM differ for each printer 3.

Moreover, the terminal 2 does not have to grasp which item is the change-allowed item HKM for each printer 3, and therefore, the terminal 2 does not have to store, for each printer 3, the setting program 210B for performing the setting of the printers 3. Thus, the setting program 210B stored in the terminal 2 may be configured as a general-purpose program commonly usable for the printers 3 regardless of models.

Referring to the flowchart FA, the terminal setting portion 2000 receives the transmission information via the terminal communicator 23 (step SA4).

Then, the terminal setting portion 2000 determines, for the change-allowed items HKM indicated by the pieces of item information KJ included in the transmission information thus received, whether or not the setting of the item value KT is performed (step SA5). For example, it is assumed that based on the function of the setting program 210B, the terminal display 22 displays a user interface via which the item values KT are set into the change-allowed items HKM indicated by the pieces of item information KJ included in the transmission information thus received. In this case, when an operation such as inputting, selecting, or the like of, for example, an item value KT to be newly set is given via the user interface, the terminal setting portion 2000 performs affirmative determination in step SA5.

When for the change-allowed items HKM indicated by the pieces of item information KJ included in the transmission information thus received, the terminal setting portion 2000 determines that the setting of the item values KT is not performed (step SA5: NO), the terminal setting portion 2000 terminates the process.

On the other hand, when for the change-allowed items HKM indicated by the pieces of item information KJ included in the transmission information thus received, the terminal setting portion 2000 determines that the setting of the item values KT is performed (step SA5: YES), the terminal setting portion 2000 generates a setting command (step SA6).

The setting command generated in step SA6 includes, for all the change-allowed items HKM indicated by the pieces of item information KJ included in the transmission information received by the terminal setting portion 2000 in step SA4, combinations of the item information KJ and the item value KT. When the terminal 2 changes the item values KT for all the change-allowed items HKM indicated by the transmission information, the item values KT included in the setting command are all item values KT to be newly set. Alternatively, when the terminal 2 changes the item values KT for some of the change-allowed items HKM indicated by the transmission information, the setting command includes the item values KT to be newly set for items to be changed and the item values KT included in the transmission information for items not to be changed. The item values KT included in the transmission information are item values KT already set in the printer-related file 312.

For example, to change the item value KT of only the baud rate item of the print speed item, the print density item, and the baud rate item included in the first printer-related file 312A, the terminal setting portion 2000 generates the following setting command. That is, the terminal setting portion 2000 generates a setting command including a combination of the print speed item information KJ-E and an item value KT representing the print speed already set in the first printer-related file 312A, a combination of the print density item information KJ-F and an item value KT representing the print density already set in the first printer-related file 312A, and a combination of the baud rate item information KJ-C and an item value KT representing the baud rate to be newly set in the baud rate item.

When generating the setting command, the terminal setting portion 2000 transmits the setting command thus generated to the first printer 3A via the terminal communicator 23 (step SA7).

Referring to the flowchart FB, the first printer controller 30A receives the setting command via the first printer communicator 31A (step SB5).

Next, the first printer setting portion 303A of the first printer controller 30A sets the item value KT included in the setting command into the first printer-related file 312A (step SB6).

In step SB6, also when the setting command includes, in addition the item value KT to be newly set, the item value KT already set in the first printer-related file 312A, that is, the item value KT which has not been changed in the terminal 2, the first printer setting portion 303A sets the item values KT into all the change-allowed items HKM as targets. The setting command includes combinations of the item information KJ and the item values KT for all the change-allowed items HKM. Thus, in step SB6, the item value KT set into the change-allowed item HKM of the first printer-related file 312A is updated to the item value KT included in the setting command. However, for the item which is not changed to a new item value KT, the setting command includes the item value KT already set. Thus, items with different item values KT of the change-allowed items HKM of the first printer-related file 312A before and after the setting by the setting command are only items for which new item values KT are to be set in the terminal 2.

As described above, the setting command transmitted from the terminal 2 is a command for instructing setting of the item value KT into the change-allowed item HKM. Thus, the first printer setting portion 303A does not erroneously set the item value KT, for example, into the change-prohibited item KKM but can securely set the item value KT into the change-allowed item HKM.

When the first printer controller 30A sets the item value KT based on the setting command, the first printer controller 30A transmits, as a response to the setting command, information showing that the setting of the item value KT is finished to the terminal 2 via the first printer communicator 31A (step SB7).

Referring to the flowchart FA, when the terminal setting portion 2000 receives, from the first printer 3A via the terminal communicator 23, information showing that the setting of the item value KT is finished (step SA8), the terminal setting portion 2000 generates a transmission request command (step SA9). Then, the terminal setting portion 2000 transmits the transmission request command thus generated via the terminal communicator 23 to the first printer 3A (step SA10).

Referring to the flowchart FB, the first printer controller 30A of the first printer 3A receives the transmission request command via the first printer communicator 31A (step SB8). The transmission request command thus received is output to the first printer selector 304A via the first printer command analyzer 301A.

Then, based on the transmission request command, the first printer selector 304A of the first printer controller 30A selects the change-allowed items HKM from the plurality of items included in the first printer-related file 312A (step SB9).

Next, the first printer generator 305A of the first printer controller 30A generates, for all the change-allowed items HKM selected by the first printer selector 304A, transmission information including combinations of the item information KJ and the item value KT (step SB10). The transmission information generated in step SB10 includes the item values KT set in accordance with the setting command.

Next, the first printer generator 305A transmits the transmission information thus generated to the terminal 2 via the first printer communicator 31A (step SB11).

Referring to the flowchart FA, the terminal setting portion 2000 receives the transmission information via the terminal communicator 23 (step SA11).

Then, the terminal setting portion 2000 compares the item value KT included in the setting command transmitted in step SA7 with the item value KT included in the transmission information received in step SA11 (step SA12). The comparison of the item values KT is performed between the same change-allowed items HKM.

The terminal setting portion 2000 determines whether or not the both item values KT match with each other based on the comparison in step SA12 (step SA13).

If the terminal setting portion 2000 determines that the item values KT matches with each other (step SA13: YES), the terminal setting portion 2000 determines that the setting of the first printer 3A is successful (step SA14) and executes a process corresponding to the determination result (step SA16). Examples of the process corresponding to the determination result include broadcasting of the determination result.

In contrast, if the terminal setting portion 2000 determines that the item values KT do not match with each other (step SA13: NO), the terminal setting portion 2000 determines that the setting of the first printer 3A is unsuccessful (step SA15) and executes the process corresponding to the determination result (step SA16).

Thus, when the first printer controller 30A receives the transmission request command from the terminal 2 after setting the item value KT included in the setting command thus received into the first printer-related file 312A, the first printer controller 30A selects the change-allowed item HKM from the plurality of items included in the first printer-related file 312A in which the item value KT included in the setting command. Then, the first printer controller 30A generates transmission information provided with the item value KT corresponding to the change-allowed item HKM thus selected and transmits the transmission information to the terminal 2 via the first printer communicator 31A.

The printer 3 may have been configured such that the item information KJ and the item value KT are transmitted to the terminal 2 for all items included in the printer-related file 312 regardless of types of the items. For example, in the case of this configuration, the first printer 3A transmits, for all of the change-prohibited item KKM, the automatic change item JKM, and the change-allowed item HKM, transmission information including combinations of the item information KJ and the item value KT to the terminal 2. When the printer 3 has this configuration, the terminal setting portion 2000 executes the following operation to perform the setting of the printer 3. That is, the terminal setting portion 2000 acquires item values KT for all the items relating to the printer 3, changes the item values KT for only the change-allowed item HKM, and acquires the item values KT for all the items relating to the printer 3. Then, the terminal setting portion 2000 compares the item values KT acquired before and after the change of the item values KT, determines, for all the items relating to the printer 3, whether or not the item values KT completely match with each other to determine whether or not the setting of the printer 3 is successful. However, between acquisition of the item value KT by the terminal 2 for a first time and acquisition of the item value KT by the terminal 2 for a second time, the printer 3 may change the item value KT of the automatic change item JKM. In this case, a difference may occur between the item value KT of the automatic change item JKM acquired for the first time and the item value KT acquired of the automatic change item JKM for the second time. Therefore, the terminal 2 may determine that the item values KT of the automatic change item JKM do not match with each other, and based on the determination, the terminal 2 may determine that the setting of the printer 3 is unsuccessful. Moreover, since there may be a case where the item values KT of the automatic change item JKM do not match with each other, it is not possible for the terminal 2 to accurately determine whether or not the setting is successful based on collectively comparing the item values KT along, for example, the alignment of the items, and therefore, accurate determination on which item of all the items relating to the printer 3 is the change-allowed item HKM has to be made to compare the item values KT. Thus, in the configuration in which the printer 3 transmits item values KT for all the items, the terminal 2 may not be able to accurately or easily perform the setting of the printer 3.

Thus, as described above, the printer controller 30A transmits transmission information provided with the item value KT corresponding to the change-allowed item HKM to the terminal 2. In this way, the terminal 2 is configured to receive only the item value KT of the change-allowed item HKM allowed to be changed by the terminal 2 from the transmission information. That is, the terminal 2 is configured to receive transmission information which does not include item values KT of items automatically changeable by the printer 3 in the setting of the printer 3. Thus, in the setting of the printer 3, the terminal setting portion 2000 is configured to perform comparison of the item values KT with only the change-allowed item HKM as a target. Therefore, the terminal setting portion 2000 is configured to accurately determine whether or not the setting of the printer 3 is successful. Moreover, the terminal 2 is configured to perform comparison of only the item values KT allowed to be changed by the terminal 2 without grasping which item is the change-allowed item HKM. Therefore, the terminal 2 is configured to collectively compare the item values KT along, for example, the alignment of the items. Thus, the terminal 2 is configured to accurately and easily set the printer 3.

As described above, the printer 3 includes the printer communicator 31 configured to communicate with the terminal 2. The printer 3 includes the printer storage 310 configured to store items relating to the printer 3 and item values KT corresponding to the items, and the printer controller 30. The items relating to the printer 3 include the change-allowed item HKM whose corresponding item value KT is allowed to be changed and the change-prohibited item KKM whose corresponding item value KT is prohibited to be changed. When the printer controller 30 receives a transmission request command from the terminal via the printer communicator 31, the printer controller 30 selects the change-allowed item HKM from the items stored in the printer storage 310 and generates transmission information provided with the item value KT corresponding to the change-allowed item HKM thus selected to transmit the transmission information thus generated to the terminal via the printer communicator 31.

Moreover, in a method for controlling the printer 3, the printer 3 stores items relating to the printer 3 and item values KT corresponding to the items. The items include the change-allowed item HKM whose corresponding item value KT is allowed to be changed and the change-prohibited item KKM whose corresponding item value KT is prohibited to be changed. Then, when the printer 3 receives the transmission request command from the terminal 2, the printer 3 selects the change-allowed item HKM from the items stored and generates transmission information provided with the item value KT corresponding to the change-allowed item HKM thus selected to transmit the transmission information to the terminal 2. Note that the method for controlling the printer 3 corresponds to an example of a control method of a printer.

According to the printer 3 and the method for controlling the printer 3, the terminal 2 is configured to determine, without grasping which item of the items related to the printer 3 is the change-allowed item HKM, which item of the items related to the printer 3 is the change-allowed item HKM based on the transmission information transmitted from the printer 3. Thus, also in the case of the first printer 3A and the second printer 3B which are different from each other in terms of the change-allowed items HKM and the change-prohibited items KKM, the terminal 2 is configured to determine, without grasping which item of the items relating to the printer 3 is the change-allowed item HKM, which item is the change-allowed item HKM for each printer 3. Therefore, the terminal 2 is configured to easily set the printers 3 also when the change-allowed item HKM and the change-prohibited item KKM differ for each printer 3. Moreover, the terminal 2 does not have to grasp which item is the change-allowed item HKM for each printer 3, and therefore, the terminal 2 does not have to store, for each printer 3, the setting program 210B for performing the setting of the printer 3. Thus, the setting program 210B stored in the terminal 2 may be configured as a general-purpose program commonly usable for the printers 3 regardless of models.

When the printer controller 30 receives the setting command from the terminal 2 via the printer communicator 31, the printer controller 30 stores, in the printer storage 310, the item value KT included in the setting command thus received as the item value KT corresponding to the change-allowed item HKM.

With this configuration, the printer controller 30 does not erroneously set the item value KT, for example, into the change-prohibited item KKM but can securely set the item value KT into the change-allowed item HKM.

The printer controller 30 stores, in the printer storage 310, the item value KT included in the setting command as the item value KT corresponding to the change-allowed item HKM. Thereafter, when the printer controller 30 receives a transmission request command from terminal 2 via the printer communicator 31, the printer controller 30 selects the change-allowed item HKM from the items stored in the printer storage 310 storing the item value KT included in the setting command and generates transmission information to transmit the transmission information to the terminal 2 via the printer communicator 31.

With this configuration, the terminal 2 is configured to receive only the item value KT of the item allowed to be changed by the terminal 2 from the transmission information. Thus, the terminal 2 is configured to execute, without grasping which item is the change-allowed item HKM, a process according to the setting of the printer 3 with only the item value KT of the change-allowed item HKM as a target, which enables the terminal 2 to easily perform the setting of the printer 3.

A printing system 1 includes a terminal 2 and a printer 3. The terminal 2 transmits a setting command to the printer 3. When the printer 3 receives the setting command, the printer 3 stores an item value KT included in the setting command as an item value KT corresponding to a change-allowed item HKM. The terminal 2 transmits a transmission request command to the printer 3. When the printer 3 receives the transmission request command, the printer 3 generates transmission information to transmit the transmission information to the terminal 2. The terminal 2 compares the item value KT included in the transmission information thus received with the item value KT included in the setting command thus transmitted to determine whether or not setting of the printer 3 is successful.

With this configuration, the terminal 2 is configured to perform the comparison of the item value KT with only the change-allowed item HKM as a target in the setting of the printer 3. Thus, the terminal 2 does not have to compare item values KT of items other than the change-allowed item HKT, and thus, it is possible to accurately determine whether or not the setting of the printer 3 is successful. Moreover, the terminal 2 is configured to perform comparison of only the item values KT allowed to be changed by the terminal 2 without grasping which item is the change-allowed item HKM, and therefore, the terminal 2 is configured to collectively compare the item values KT along, for example, the alignment of the items. Thus, the terminal 2 is configured to accurately and easily set the printer 3.

The transmission information is information described in JSON format.

With this configuration, also when the number of change-allowed items HKM is large, it is possible to suppress an increase in data size of the transmission information.

The embodiment is an example of the disclosure and may be arbitrarily modified and applied within the scope of the disclosure.

For example, the embodiment has illustrated that the printer-related file 312 includes a model name item and a version item as the change-prohibited items KKM. However, in accordance with the model of the printer 3, other items, such as the baud rate item of the second printer-related file 312B, may be present as change-prohibited items KKM in the printer-related file 312.

Moreover, the embodiment has illustrated that an operation time item is present as the automatic change item JKM of the printer-related file 312, but other items automatically changeable by the printer 3 may be present.

Moreover, the embodiment has illustrated that the printer-related file 312 includes a model name item and a version item as the change-allowed items HKM. However, in accordance with the model of the printer 3, other items, such as the baud rate item of the first printer-related file 312A, may be present as change-prohibited items KKM in the printer-related file 312. Moreover, regardless of the model of the printer 3, other item may be present as the change-allowed item HKM.

Moreover, the embodiment has illustrated a case where the DIP switch 321B sets the baud rate for communication with the terminal 2, but the baud rate set by the DIP switch 321B may be a baud rate for communication between the printer 3 and a device to be connected to the printer 3. Moreover, a target which the DIP switch 321B sets is not limited to the baud rate.

Moreover, the embodiment has illustrated that the first printer 3A and the second printer 3B are different models depending on whether or not the DIP switch 321B is provided, but the models of the printers 3 are not limited to the models depending on whether or not the DIP switch 321B is provided, and the models of the printers 3 may be models depending on other factors.

Moreover, the embodiment relates to the setting of the item values KT in the items relating to the printer 3 and has illustrated a case where the item values KT are described in the printer-related file 312, but the setting of the item values KT is not limited to the description into the printer-related file 312 but the item values KT may be written in a variable of a prescribed program.

Moreover, functions of the terminal controller 20 and the printer controller 30 may be realized by a plurality of processors or semiconductor chips.

Moreover, each component shown in FIG. 1 is a mere example, and specific embodiments are not particularly limited. That is, pieces of hardware individually corresponding to respective components do not necessarily have to be mounted, but it is also possible to configure such that one processor executes a program, thereby realizing respective functions of the components. Moreover, some of functions realized by software in the embodiment may be realized as hardware, or some of the functions realized by hardware may be realized by software. Specific detailed configurations of other components than the terminal 2 and the printer 3 may also accordingly be modified without departing from the spirit of the present disclosure.

Moreover, step units of the operation shown in, for example, FIG. 3 are obtained by division in accordance with main process contents for ease of understanding of operation of each component in the terminal 2 and the printer 3, and a method for the division of and names of process units do not limit the present disclosure. In accordance with the process contents, the step units may be divided into a larger number of step units. Alternatively, one step unit may be divided to include further increased number of processes. The order of the steps may be changed accordingly without departing from the scope of the present disclosure.

What is claimed is:

1. A printer configured to communicate with an external device, the printer comprising:
 a switch configured to set an item value that corresponds to a predetermined item,
 a memory configured to store items relating to the printer and item values corresponding to the items; and
 a processor configured to control the memory, wherein the items include:
  one or more first items, each of which corresponds to an item value that is allowed to be changed by the external device,
  one or more second items, each of which corresponds to an item value that is prohibited from being changed by anyone, and
  one or more third items, each of which corresponds to an item value that is prohibited from being changed by the external device, but allowed to be changed by operation of the switch of the printer,
 the processor is configured to:
  receive a transmission request command from the external device,
  in response to receiving the transmission request command,
   select the first items from the items stored in the memory,
   generate transmission information including the first items and the corresponding item values stored in the memory, and
   transmit the transmission information generated to the external device.

2. The printer according to claim 1, wherein
the processor is configured to:
receive a setting command from the external device, the setting command including at least one of the one or more first items and corresponding item values set by a user of the external device, the corresponding item values in the setting command being different from the corresponding item values stored in the memory, and
store, in the memory, the item values included in the setting command received as the item values corresponding to the first items, replacing the corresponding item values previously stored in the memory.

3. The printer of claim 2, wherein
the processor is configured to, when receiving the transmission request command from the external device after storing, in the memory, the item values included in the setting command as the item values corresponding to the first items, select the first item stored from the items in accordance with the setting command, and generate the transmission information to transmit the transmission information to the external device.

4. The printer of claim 1, wherein
the transmission information is information described in JSON format.

5. A method for controlling a printer configured to communicate with an external device, the method including:
setting an item value that corresponds to a predetermined item by a switch,
storing items relating to the printer and item values corresponding to the items in a memory, the items including one or more first items, each of which corresponds to an item value that is allowed to be changed by the external device, one or more second items, each of which corresponds to an item value that is prohibited from being changed, and one or more third items, each of which corresponds to an item value that is prohibited from being changed by the external device, but allowed to be changed by operation of the switch of the printer;
receiving a transmission request command from the external device;
in response to receiving the transmission request command,
selecting the first items from the items;
generating transmission information including the first items and the corresponding item values stored in the memory; and
transmitting the transmission information to the external device.

6. The method of claim 5, wherein
when a setting command from the external device is received, the item value included in the setting command received is stored as the item value corresponding to the first item.

7. The method of claim 6, wherein
when the transmission request command from the external device is received after the item value included in the setting command is stored as the item value corresponding to the first item, the first item stored is selected from the items in accordance with the setting command, the transmission information is generated, and the transmission information is transmitted to the external device.

8. The method of claim 5, wherein
the transmission information is information described in JSON format.

9. A printing system comprising:
an external device; and
a printer configured to communicate with the external device, and includes a switch configured to set an item value that corresponds to a predetermined item, wherein
the printer is configured to store items relating to the printer and item values corresponding to the items in a memory, the items including one or more first items, each of which corresponds to an item value that is allowed to be changed by the external device, one or more second items, each of which corresponds to an item value that is prohibited from being changed, and one or more third items, each of which corresponds to an item value that is prohibited from being changed by the external device, but allowed to be changed by operation of the switch of the printer,
the external device is configured to transmit a transmission request command to the printer,
the printer is configured to,
receive the transmission request command from the external device,
in response to receiving the transmission request command,
select the first items from the items stored at the printer,
generate transmission information including the selected first items and the corresponding item values stored at the printer, and
transmit the transmission information generated to the external device,
the external device is configured to,
receive the transmission information,
display, to a user interface, all the first items whose item values are changeable,
allow a user of the external device to reset the item values of the first items in response to receiving the transmission information,
in response to receiving the transmission information,
transmit a setting command including at least one of the one or more first items and corresponding the item values to the printer, the corresponding item values in the setting command being different from the corresponding item values stored in the memory,
the printer is configured to, when receiving the setting command, store the item values included in the setting command as the item value corresponding to the at least one first item, replacing the corresponding item values previously stored at the printer.

10. The printing system of claim 9, wherein
when the printer receives a setting command from the external device, the item value included in the setting command received is stored as the item value corresponding to the first item.

11. The printing system of claim 10, wherein
when the printer receives the transmission request command from the external device after the item value included in the setting command is stored as the item value corresponding to the first item, the printer selects the first item stored from the items in accordance with the setting command, and generates the transmission information to transmit the transmission information to the external device.

12. The printing system of claim 9, wherein
the transmission information is information described in JSON format.

* * * * *